United States Patent
Spinks

[11] Patent Number: 6,112,477
[45] Date of Patent: *Sep. 5, 2000

[54] PUMPABLE DESICCATED MASTIC

[75] Inventor: Anne Spinks, Hugo, Minn.

[73] Assignee: H. B. Fuller Licensing & Financing Inc., St. Paul, Minn.

[*] Notice: This patent is subject to a terminal disclaimer.

[21] Appl. No.: 08/831,202

[22] Filed: Apr. 2, 1997

Related U.S. Application Data

[63] Continuation-in-part of application No. 08/626,839, Apr. 2, 1996, Pat. No. 5,632,122, which is a continuation-in-part of application No. 08/031,602, Mar. 15, 1993, Pat. No. 5,510,416.

[51] Int. Cl.$^7$ ........................................... E06B 7/12
[52] U.S. Cl. .................. 52/172; 52/171.3; 52/788; 52/789; 52/790; 52/786.13; 524/528; 156/107; 29/469.5; 29/530; 428/34
[58] Field of Search .................. 524/528; 156/107; 52/172, 788, 786.13, 171.3, 789, 790; 29/469.5, 530; 428/34

[56] References Cited

U.S. PATENT DOCUMENTS

| | | |
|---|---|---|
| 3,965,215 | 6/1976 | Lopez et al. ........................ 525/319 |
| 4,045,401 | 8/1977 | Stenmark et al. .................. 525/197 |
| 4,109,431 | 8/1978 | Mazzoni et al. ...................... 52/172 |
| 4,197,381 | 4/1980 | Alia ...................................... 525/222 |
| 4,198,254 | 4/1980 | Laroche et al. ...................... 156/107 |
| 4,226,063 | 10/1980 | Chenel ................................... 52/172 |
| 4,431,691 | 2/1984 | Greenlee ................................ 428/34 |
| 4,622,249 | 11/1986 | Bowser .................................. 428/34 |
| 4,994,309 | 2/1991 | Reichert et al. ....................... 428/34 |
| 5,510,416 | 4/1996 | Meyer et al. ......................... 524/528 |

FOREIGN PATENT DOCUMENTS

| | | |
|---|---|---|
| 433 386 | 10/1991 | European Pat. Off. . |
| 0 475 213 | 3/1992 | European Pat. Off. . |
| 2 127 173 | 6/1971 | Germany . |
| 58-201213 | 10/1983 | Japan . |
| 60-92379 | 5/1985 | Japan . |
| 9212212 | 7/1992 | WIPO . |
| 9505427 | 2/1995 | WIPO . |
| 9608541 | 3/1996 | WIPO . |

OTHER PUBLICATIONS

ASTM, E 773–88, "Standard Test Methods for Seal Durability of Sealed Insulating Glass Units".
Popular Science, Aug., 1992, Closing the Gaps in Window Efficiency, By Alex Wilson.
Edgetech, A Division of Lauren, Technical Report, Super Spacer By Michael Glover and Gerhard Reichert, Sep., 1989.
Packaging World, "Materials & Containers" Section, Hot Melt With Dessicant, Mar. 1997, vol. 4, No. 3, p. 18.

*Primary Examiner*—Peter D. Mulcahy
*Attorney, Agent, or Firm*—Nancy N. Quan

[57] ABSTRACT

A pumpable, thermoplastic desiccated mastic capable of desiccating a sealed insulating glass unit. The disclosed compositions comprise a defined resin component and a desiccant/adsorbent component comprising at least 20% by weight of the composition of a desiccant or moisture and volatile organic chemical adsorbing material. The said desiccant/adsorbent component being present in an amount less than the level which will cause the composition when tested as set forth in ASTM D-1238, Procedure B using a 1100 gram load and an 8 gram sample at 190° C. to provide a melt flow time for a piston travel of 2.54 cm(1 inch) of more than 60 seconds.

29 Claims, 1 Drawing Sheet

PUMPABLE DESICCATED MASTIC

This application is a continuation-in-part of application Ser. No. 08/626,839, filed Apr. 2, 1996, now U.S. Pat. No. 5,632,122, which is a continuation-in-part of application Ser. No. 08/031,602, filed Mar. 15, 1993, now U.S. Pat. No. 5,510,416, both of which are incorporated herein by reference.

BACKGROUND OF THE INVENTION

In recent years, much work has been done to design spacers for insulating glass units. Metal spacers between opposing panes can conduct heat efficiently so that the insulating performance is substantially reduced. Several alternative spacer designs have been described in *Popular Science*, August 1992 at page 46. Another alternative spacer design which has been developed to provide a highly desirable combination of structural integrity, moisture and gas impermeability and thermal efficiency is described in EP 475,213. This spacer utilizes a metal U-channel separated from the glass panels and the exterior edge of the assembly by a thermal brake. The U-channel opens to the interior of the assembly and includes a moisture permeable adhesive having a desiccant therein on the inner bottom surface of the channel. Adhesive materials having a permeability of greater than 2 gm mm/M$^2$ day as determined by ASTM F-372-73 are recommended. The desiccant loaded adhesive material contemplated for use in the invention has been a polyurethane-based formulation which is formed into a soft string and applied to the U-channel.

It would be an advantage to have a pumpable desiccant loaded formulation which could be more easily applied to the U-channel of the EP 475,213 reference and which would effectively desiccate the insulating glass assembly over its useful life.

Insulating glass assemblies can be subject to accumulation of unsightly chemical "fog" on the interior surface of the glass panels. Fogging can be caused by off-gassing of organic materials in the spacer or from other structures in the interior of the insulating glass assembly such as painted decorative grids. Off-gassing can be caused, for instance, by incompletely dry coatings on such grids or by UV or thermally induced degradation of a polymer during the service life of the insulating glass assembly. Any desiccant loaded material which is utilized in the U-channel of EP 475,213 should not contribute to chemical fogging and, desirably, should effectively adsorb organics originating from other structures within the insulating glass assembly so as to reduce chemical fogging.

The desiccant containing adhesive material utilized in the U-channel structure described in EP 475,213 must also be able to withstand elevated temperature without sagging or creeping and must maintain adhesion to the channel during the service life of the unit. Because the U-channel is open, any sagging, creeping or peeling of the desiccant composition will be readily visible. Cracking or crazing of the desiccant composition due to UV light degradation would also be readily visible.

These numerous requirements severely limit the options available for formulating a pumpable desiccant loaded material suitable for use in spacer structures of the type disclosed in EP 475,213.

In U.S. Pat. No. 5,510,416, the inventors of the present application disclose thermoplastic hot-melt mastic compositions which simultaneously meet rigorous pumpability, non-fogging, desiccant loading, and non-sag requirements of the open U-channel spacer structure of EP 475,213. Such compositions suitably include a resin component consisting essentially of 4–30 parts by weight of the resin component of a film former selected from the group consisting of polyisobutylene polymers having a weight average molecular weight in the range of about 35,000 to about 60,000, and mixtures of such polymers with minor amounts of a butyl rubber having a weight average molecular weight of up to about 500,000; 20–50 parts by weight of the resin component of a non-crystalline homopolymer, copolymer, terpolymer or graft copolymer comprising polypropylene; and, 0–20 parts by weight of the resin component of a low volatile UV stable tackifier compatible with the film former and polypropylene components; and an adsorbent component which includes at least 20% by weight of the composition of a moisture or moisture and volatile organic chemical adsorbing material; and 0–10% by weight of the composition of an adsorbent of volatile organic compounds.

SUMMARY OF THE INVENTION

The present invention pertains to additional thermoplastic mastic compositions similar to those disclosed in U.S. Pat. No. 5,104,416, but which are further characterized by the inclusion, in the film-former element of the resin component, of at least one of a relatively low molecular weight liquid polybutene polymer, a homogenous substantially linear ethylene/α-olefin interpolymer or a linear, Y block or star block copolymer rubber. In the case of the substantially linear ethylene/α-olefin interpolymer, such polymer may also, or alternatively, be used to replace some or all of the propylene polymer component of the compositions disclosed in U.S. Pat. No. 5,104,416.

The inventive compositions adhere well to the U-channel material and do not flow or sag under the normal range of service conditions encountered by an insulating glass assembly. Surprisingly the compositions of the invention can be prepared without causing fogging of the window unit, or causing the material to sag in the window unit and have satisfactory performance on exposure to UV.

The compositions of the invention comprise a mixture of:
A) a resin component consisting essentially of:
  i) 4–75% by weight of the resin component of a film former, the film former including a member selected from the group consisting of:
    a) a homogeneous substantially linear ethylene/α-olefin interpolymer;
    b) a linear, Y block or star block copolymer rubber;
    c) a liquid polybutene polymer; or
    d) mixtures of a, b, and/or c;
  alone, or combination with one or more polymers selected from the group consisting of:
    e) a polyisobutylene polymer having a weight average molecular weight of about 35,000 or more; and
    f) a butyl rubber having a weight average molecular weight of up to about 500,000, said butyl rubber, if present, representing less than 50% of the film former component;
  ii) 25–96% by weight of the resin component of an alkylene polymer component consisting of a member selected from the group consisting of:
    a) a non-crystalline homopolymer, copolymer, terpolymer or graft copolymer comprising a monomeric unit of propylene;
    b) a homogeneous substantially linear ethylene/α-olefin interpolymer; and c) mixtures thereof;

iii) 0–20% by weight of the resin component of a low volatile UV stable tackifier compatible with the film former and alkylene polymer components; and B) a desiccant/adsorbent component comprising:
   i) at least 20% by weight of the composition of a desiccant or moisture and volatile organic chemical adsorbing material; and
   ii) 0–10% by weight of the composition of an adsorbent of volatile organic compounds, said desiccant/adsorbent component being present in an amount less than the level which will cause the composition when tested as set forth in ASTM D-1238, Procedure B using a 1100 gram load and an 8 gram sample at 190° C. to provide a melt flow time for a piston travel of 2.54 cm (1 inch) of more than 60 seconds.

Preferred compositions of the invention provide a melt flow time under the specified conditions of less than 25 seconds.

It is also preferable that the desiccant/absorbent comprise moisture and organic vapor removal compounds.

Insulating glass units prepared with the desiccating mastic of the invention and methods of manufacturing edge assemblies for insulating glass units by pumping heated formulations of the invention onto the edge assembly comprise further aspects of the invention disclosed herein.

DESCRIPTION OF THE INVENTION

Figure 1:
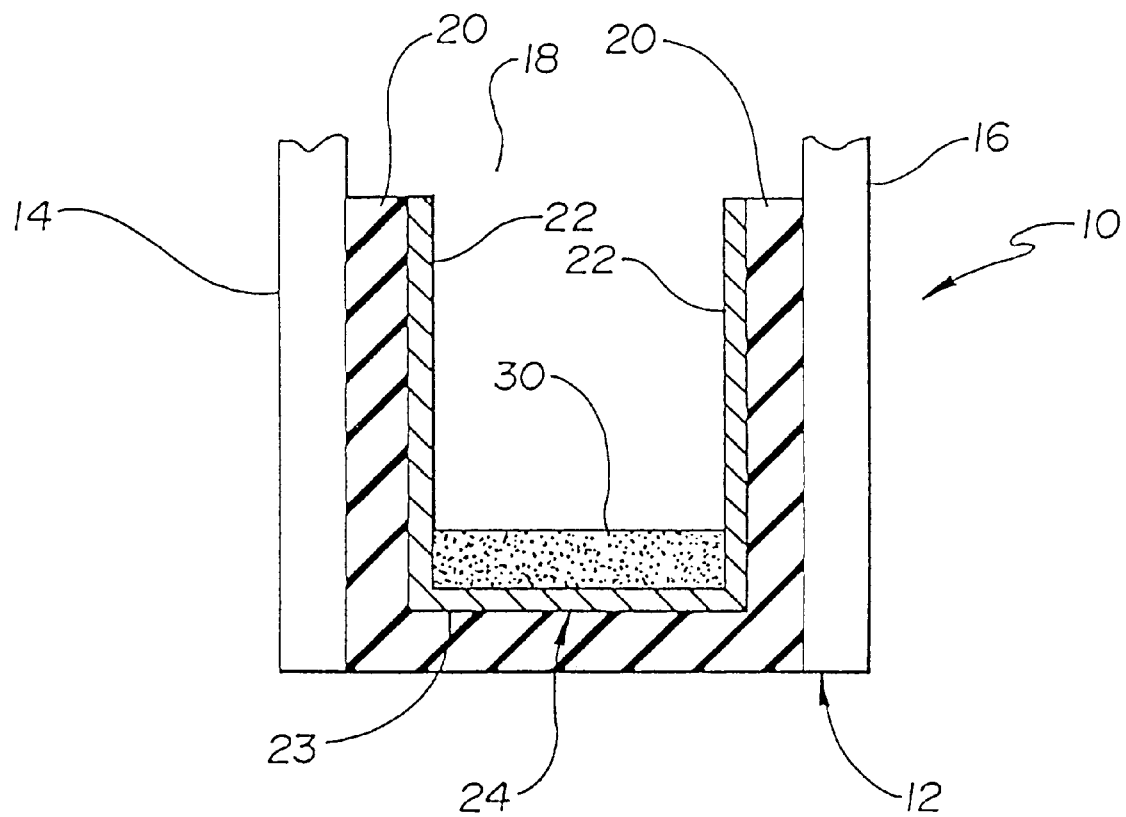
FIG. 1 is a sectional view of the edge assembly of an insulating unit employing a pumpable mastic desiccant of the invention.

Referring to the figure there is shown in FIG. 1 an insulating unit 10, having edge assembly 12 which serves to space the glass sheets 14 and 16 to provide the compartment 18. The edge assembly 12 includes a moisture and/or gas impervious adhesive type sealant layer 20 to adhere the glass sheets 14 and 16 to legs 22, 23 of metal spacer 24. A thin layer of a desiccating formulation 30 of the invention is applied on the inner surface of leg 23 of metal spacer 24 to adsorb moisture in the compartment 18.

Throughout this application quantities given in percentages or parts are to be understood as percentages or parts by weight unless specified otherwise.

For automated application of hot melt formulations via extended length delivery lines a much lower viscosity is required than is acceptable when the composition is merely extruded as a bead of material. The compositions utilized in the present invention are "pumpable" a much lower viscosity standard than merely extrudable. Specifically, as used herein, a composition is considered "pumpable" if, when tested per ASTM D-1238, Procedure B using a 1100 gram load and an 8 gram sample at 190° C.(374° F.), the melt flow time of the composition is no more than 60 seconds. Melt flow time is measured using a 2.54 cm (1 inch) piston travel as mandated by section 10.1.2.5 of that ASTM procedure. Actual pumping temperatures are considerably lower, typically about 88–121° C.(190–250° F.), preferably about 110° C.(230° F.), but this melt flow test is considered to be a good predictor of pumpability with conventional industrial hot melt applicators. Preferably the melt flow time is no more than 25 seconds, and still more preferably not more than 15 seconds, under the specified conditions.

In some cases, with very pumpable formulations of the invention, the 4 minute wait time of the ASTM test method may result in the composition flowing through the test apparatus before the test is initiated. In such cases the melt time value is considered to be less than 1 second for purposes of this invention. To obtain a consistent measure of melt times under such conditions, e.g. for quality control purposes, a shorter wait of 1–1.5 minutes and a lower weight of 200–800 gm may be used.

To assure that the formulation will stay in place under normal service conditions the compositions should, at minimum show no visible sag or flow when installed in the insulating glass assembly and maintained at a temperature of at least 60° C.(140° F.) for a continuous period of at least 2 weeks. Preferably the formulation will withstand at least 88° C.(190° F.) for at least 1 month.

Fogging may be determined in a sealed insulating glass unit per ASTM E-773, using the pass/fail specification of ASTM E-774 or per the Canadian fog test (Can CGSB12.8). However, as a practical matter, a composition which passes the draft test method of ASTM subcommittee C24.15 for Hot Applied Sealants entitled "Standard Test Method For Fogging of Hot Applied Insulating Glass Unit Components", dated Jun. 12, 1994, can be reasonably assured to also pass the specification of ASTM E-774. The C24.15 subcommittee draft test method has been used for testing non-fogging behavior of the inventive compositions.

The formulations of the invention are stable to exposure to UV as determined by no discoloration when exposed in an enclosed box exposure to light from a Sylvania Sunlamp RSM 275W UV bulb at a distance of approximately 30.48 cm (12 inches) for 72 hours.

The formulations of the invention may be tested for ability to dry an insulating glass unit by frost point determination. The frost point is the temperature at which condensation occurs within the sealed unit. The test method conforms to ASTM E-546. Lowering of the initially obtained frost point over time demonstrates that the formulation effectively removes moisture from the air space of the test panel.

Although described herein in terms of a resin component, an desiccant/adsorbent component and other additives, it should be understood that this division of ingredients is used only for purposes of stating the relative quantities of ingredients and that an order of mixing of the various ingredients is not implicated thereby. Further, although it is not believed that the compositions of the invention undergo chemical reaction, the mixtures as claimed herein are to be understood as the result of mixing at the specified proportions, whether or not some chemical reaction between the specified components takes place upon mixture.

RESIN COMPONENT

Film Former

The film former component used in the invention provides low temperature flexibility. In accordance with the present invention, the film former includes at least 1%, and up to 100% of the film former component of at least one of: a liquid polybutene polymer; a homogeneous substantially linear ethylene/α-olefin interpolymer; or, a linear or star block copolymer rubber. The remaining portion of the film former may optionally comprise a polyisobutylene polymer having a weight average molecular weight of about 35,000 or more and/or a butyl rubber.

Liquid Polybutene

The film former may comprise up to 100% liquid polybutene polymers. That is, their pour point as determined by ASTM D-97 is below 70° F.(21° C.). The liquid character of these polymers makes it very surprising that they can be incorporated into the inventive compositions at any levels. Such polymers are copolymers of isobutylene with but-1-ene and/or but-2-ene. Typically these polymers will have a weight average molecular weight of from 370 to about 5000, more preferably from about 900 to about 3000. Such polymers are incorporated into the composition at a level which, taking into account the other ingredients in the resin component of the formulation and the desiccant level employed, produces a formulation which does not sag, does not deteriorate on exposure to UV, does not fog and is pumpable as defined herein. In some formulations this level may be as high as 100% of the film former component, especially for the upper end of the molecular weight range specified. In general it is preferred that the liquid polybutene polymer be employed at a level of 1–50% of the film former component.

When the liquid polybutene rubber is included in film-former component of the composition, non-sagging formulations having melt flow times of less than 5 seconds can be easily formulated.

Suitable liquid polybutenes are sold by Amoco under the trademark Indopol®, and by Exxon under the trademark Parapol®.

Homogeneous Linear or Substantially Linear Ethylene/α-olefin Interpolymer

The homogeneous linear or substantially linear ethylene/α-olefin interpolymer is an ethylene polymer prepared using a constrained geometry catalyst. By the term homogenous, it is meant that any comonomer is randomly distributed within a given interpolymer molecule and substantially all of the interpolymer molecules have the same ethylene/comonomer ratio within that interpolymer. The DSC melting peak of homogeneous linear and substantially linear ethylene polymers will broaden as the density decreases and/or as the number average molecular weight decreases. However, unlike heterogeneous polymers, when a homogeneous polymer has a melting peak greater than 115° C.(such as is the case of polymers having a density greater than 0.940 g/cm$^3$), such polymer does not additionally have a distinct lower temperature melting peak.

Homogeneous linear and substantially linear interpolymers useful in the invention further differ from low density polyethylene prepared in a high pressure process. In one regard, whereas low density polyethylene is an ethylene homopolymer having a density of from 0.900 to 0.935 g/cm$^3$, the homogeneous linear and substantially linear interpolymers useful in the invention require the presence of a comonomer to reduce the density to the range of from 0.855 to 0.903 g/Cm$^3$.

A further characterization of the homogeneous linear and substantially linear interpolymers useful in the invention is that they have a narrow molecular weight distribution ($M_W/M_n$). For the linear and substantially linear interpolymers, the $M_W/M_n$ is from 1.5 to 2.5, preferably from 1.8 to 2.2.

In addition, or in the alternative, the homogeneity of the polymer may be described by the SCBDI (Short Chain Branching Distribution Index) or CDBI (Composition Distribution Breadth Index), which are defined as the weight percent of the polymer molecules having a comonomer content within 50 percent of the median total molar comonomer content. The SCBDI of a polymer is readily calculated from data obtained from techniques known in the art, such as, for example, temperature rising elution fractionation (abbreviated herein as "TREF"), which is described, for example, in Wild et al., *Journal of Polymer Science, Poly. Phys. Ed.*, Vol. 20, p.441 (1982), in U.S. Pat. No. 4,798,081 (Hazlitt et al.), or in U.S. Pat. No. 5,089,321 (Chum et al.), the disclosures of all of which are incorporated herein by reference. The SCBDI or CDBI for the homogeneous linear and substantially linear interpolymers useful in the invention is preferably greater than 50 percent, more preferably greater than 70 percent, with SCBDI's and CDBI of greater than 90 percent being easily attained.

Substantially linear ethylene interpolymers are homogeneous interpolymers having long chain branching. Due to the presence of such long chain branching, substantially linear ethylene interpolymers are further characterized as having a melt flow ratio ($I_{10}/I_2$) which may be varied independently of the polydispersity index, i.e., the molecular weight distribution $M_W/M_n$. This feature accords substantially linear ethylene polymers with a high degree of processability despite a narrow molecular weight distribution.

The long chain branches of substantially linear ethylene interpolymers have the same comonomer distribution as the interpolymer backbone and can be as long as about the same length as the length of the interpolymer backbone. When a substantially linear ethylene interpolymer is employed in the practice of the invention, such interpolymer will be characterized as having an interpolymer backbone substituted with from 0.01 to 3 long chain branches per 1000 carbons.

Preferably, the first polymer of the chain will be an interpolymer of ethylene with at least one comonomer selected from the group consisting of $C_3$–$C_{20}$ α-olefins, non-conjugated dienes, and cycloalkanes. Exemplary $C_3$–$C_{20}$ α-olefins include propylene, isobutylene, 1-butene, 1-hexene, 4-methyl-pentene, 1-heptene, and 1-octene. Preferred $C_3$–$C_{20}$ α-olefins include 1-butene, 1-hexene, 4-methyl-1-pentene, 1-heptene, and 1-octene, more preferably 1-hexene and 1-octene. Exemplary cycloalkanes include cyclopentene, cyclohexene, and cyclooctene.

The non-conjugated dienes suitable as comonomers, particularly in the making of ethylene/α-olelin/diene terpolymers, are typically non-conjugated dienes having from 6 to 15 carbon atoms. Representative examples of suitable non-conjugated dienes include:

a) Straight chain acyclic dienes such as 1,4-hexadiene; 1,5-heptadiene; and 1,6-octadiene;

b) Branched chain acyclic dienes such as 5-methyl-1,4-hexadiene; 3,7-dimethyl-1,6 octadiene; and 3,7-dimethyl-1,7-octadiene;

c) Single ring alicyclic dienes such as 4-vinylcyclohexene; 1-allyl-4-isopropylidenecyclohexane; 3-allylcyclopentene; 4-allylcyclohexene; and 1-isopropenyl-4 butenylcyclohexene;

d) Multi-ring alicyclic fused and bridged ring dienes such as dicyclopentadiene; alkenyl, alkylidene, cycloalkenyl, and cycloalkylidene norbornenes, such as 5-methylene-2 norbomene; 5-methylene-6-methyl-2-norbornene; 5-methylene-6,6-dimethyl-2 norbornene; 5-propenyl-2-norbornene; 5-(3-cyclopentenyl)-2-norbornene; 5-ethylidene-2-norbornecie; 5-cyclohexylidene-2-norbornene; etc.

The preferred dienes are selected from the group consisting of 1,4-hexadiene; dicyclopentadiene; 5-ethylidene-2-norbornene; 5-methylene-2-norbornene; 7-methyl-1,6-octadiene; piperylene; and 4-vinylcyclohexene. The ethylene/α-olefin interpolymer will have a density of from 0.850 to 0.965 g/cm$^3$, preferably from 0.855 to 0.903 g/cm$^3$, and most preferably from 0.870 to 0.903 g/cm$^3$. The ethylene/α-olefin interpolymer may be of high or low molecular weight. Suitable number average molecular weight range from 3,000 to 100,000, preferably from 3,000 to 60,000, more preferably from 3,000 to 40,000.

Specific useful thermoplastic polymers of this type that may be used as film former components in the adhesives of the present invention are homogeneous linear or substantially linear interpolymers of ethylene with at least one $C_2$ to $C_{20}$ α-olefin, further characterized by each said interpolymer having a polydispersity less than about 2.5 including such polymers as Exact™ 5008, an ethylene-butene copolymer, Exxpol™SLP-0394, an ethylene-propylene copolymer, Exact 3031, an ethylene-hexene copolymer, all available from Exxon Chemical Co. These types of polymers are also available from Dow Chemical Co. in Midland, Mich. under the trade name of Insite™.

Linear or Star Block Copolymer Rubber

The block copolymers rubber useful in the present invention include aromatic/aliphatic block copolymers such as styrene-isoprene-styrene (SIS) and styrene-butadiene-styrene (SBS) block copolymers having a styrene content from about 15% to about 50% by weight in the copolymer and a diblock content from 0% to about 90% by weight in the copolymer. These block copolymers may have the general configuration A-B-A triblocks, A-B diblocks, A-B-A-B-A-B multiblocks, Y blocks and radial blocks, including styrene-ethylene-butene-styrene (SEBS) and styrene-ethylene-propylene-styrene (SEPS). Depending on the specific polymer employed these polymers may be employed as some or all of the film former component. If employed, it is preferred that the block copolymer rubber be utilized in an amount of up to about 80% of the film former component, more preferably from about 10% to about 50% of the film former component.

Examples include Stereon 840A and 845A, A-B-A-B-A-B multi block copolymers of styrene and butadiene having styrene contents of about 45% by weight in the copolymer; other block copolymers under the trade name of Kraton™ G and Kraton™ D from Shell Chemical Co.; other polymers under the trade name of Vector™ from Dexco Chemical Co. including styrene-isoprene-styrene (SIS), ethylene-butene-styrene (EBS) and butadiene-styrene (BS). Specific examples of useful block copolymers include Kraton™ D-1 1102, a 28% styrene and 15% diblock linear SBS; Kraton™ D-1107, a 15% styrene and 18% diblock linear SIS; Kraton™ D-1111, a 22% styrene and 15% diblock linear SIS; Kraton™ D-1112, a 15% styrene and 40% diblock linear SIS; Kraton™ D-1113, a 16% styrene and 55% diblock linear SIS; Kraton™ D-1117, a 17% styrene and 35% diblock linear SIS; Vector™ 8508, a 28% styrene and 0% diblock linear SBS; Vector™ 2518, a 30% styrene and 0% diblock linear SBS; Vector™ 4111, an 18% styrene and 0% diblock linear SIS; Vector™ 4113, a 15% styrene and 18% diblock linear SIS; Vector™ 4114, a 15% styrene and 42% diblock linear SIS; and Vector™ 4211, a 28% styrene and 0% diblock linear SIS.

Polyisobutylene Polymers/Butyl Rubber

Polyisobutylene polymers having a number average molecular weight of about 35,000 or more, preferably 35,000–60,000, most preferably from about 50 to about 56,000, and/or a butyl rubber (weight average molecular weight up to about 500,000) make up the balance of the film former component. If used, the butyl rubber, and any polyisobutylene polymers having weight average molecular weights above 60,000, are desirably limited to an amount no more than 50% of the film former component. A suitable polyisobutylene product is Vistanex™ LMMH, sold by Exxon. A suitable butyl rubber, if used, is Butyl 268, sold by Exxon.

Alkylene Polymer

The resin component further comprises 20–96% by weight an alkylene polymer component. This component may be a non-crystalline homopolymer, copolymer, terpolymer or graft copolymer comprising a monomeric unit of propylene; and/or a homogeneous substantially linear ethylene α-olefin interpolymer.

The alkylene polymer component functions to give the formulation the cohesive strength and heat resistance necessary for use as a desiccating material in an open U-channel insulating glass assembly of the type shown in FIG. 1. It must have a low volatiles content, be compatible with a film former and, if propylene polymer is use, must be non-crystalline.

Various propylene polymers are suitable such as the Rextace® APO series polymers including Rextac® 2100 series homopolymers, 2500 series ethylene-propylene copolymers and 2700 series butene-propylene copolymers and terpolymers. These products typically have a number average molecular weight ($M_n$) in the range of about 7,000–14,000; weight average molecular weight ($M_W$) in the range of about 35,000–90,000; Z average ($M_Z$) in the range of about 13,000–33,000 and polydispersity (MWD) in the range of about 4.9–6.2. Other polymers which may be used are sold under the trademark Eastoflex by Eastman Chemical, such as Eastoflex T1 035, a propylene-ethylene-butene terpolymer having a $M_n$ of about 4,000 and a $M_W$ of about 16,000; Eastman D-178; Eastman E 1060; and K-Tac® A-100 amorphous polypropylene sold by Baychem.

For the alkylene polymer component a homogeneous substantially linear ethylene/α-olefin interpolymer, may also be used. Examples of such interpolymers are disclosed above in the discussion about the homogeneous linear or substantially linear ethylene/α-olefin interpolymers which may be incorporated as the film-former component of the composition. Thus, it is possible for some or all of both the film former and the alkylene polymer components to be satisfied by the same material in the case where the film former and the alkylene polymer are both a homogeneous substantially linear ethylene/α-olefin interpolymer. Alternatively, the interpolymer can be used to satisfy some or all of either of the film-former or alkylene components of the composition. Expressed quantitatively, the homogeneous substantially linear ethylene/α-olefin interpolymer may be employed in an amount of from 0 to 100% of the resin component of the inventive composition.

Tackifying Resins

The use of a tackifying resin is preferably avoided entirely. It has been found that most tackifiers, even when extensively vacuum stripped, can contribute substantially to chemical fogging. Many tackifiers are also incompatible with the film former/polymer combination used in the invention. In the preferred formulations of the invention, good adhesion to the substrate can be obtained without use of any tackifier. If a tackifying resin is used, it is preferably one which has good UV resistance, low volatiles, and is compatible in the formulation. Hydrogenated wood rosin, such as Foral 105 sold by Hercules, or hydrocarbon tackifying resins, such as Regal Rez 1094 hydrogenated hydrocarbon tackifying resin and Exxon ECR 165C $C_5/C_9$ tackifying resin, are recommended if a tackifier is employed.

Desiccant/adsorbent Component

The desiccant/adsorbent component may be one or more of the known moisture adsorbing materials, alone or in combination with adsorbents of low molecular weight organics, such as natural zeolite (erg. chabasite, gumerinite, levynite, erinite, mordenite and analcite), molecular sieves, silica gel, silica-magnesia gel, silica-alumina gel, activated carbon, activated alumina, etc. At least 20%, preferably at least 30%, by weight of the composition is a moisture adsorbing desiccant. Preferably the desiccant content is between about 30 and 65% by weight of the composition. Suitably, the desiccant/adsorbent component also includes up to about 10%, preferably 5–10%, of an adsorbent of volatile organiics. An adsorbent component which functions to remove both moisture and volatile organics, such as molecular sieve 13x, may also be employed as part or all of this component of the formulation. The maximum level of desiccant/adsorbent is the level at which the composition becomes unpumpable as defined herein. This level may be 70% or higher depending on the particular resin component used and the presence or absence of any filler ingredients. A preferred component is a mixture of about 30–65%, more preferably about 40–60% by weight of the composition of a desiccant such as molecular sieve 3A or 4A and 8–10% by weight of the composition of a desiccant/organic vapor adsorbent, such as molecular sieve 13X. Desirably the desiccant and chemical adsorbent components are in the form of a powder of 50–100 mesh or less. The desiccant may be a high potassium (greater than 14% by weight $K_2O$) zeolite A as described in WO 96/37278, which is incorporated herein by reference.

Although moisture adsorbing desiccants are preferred, it should be understood that desiccating materials which are classified as chemical desiccants, such as CaO, may also be employed as some or all of the desiccant/adsorbent component.

Other Additives

The formulation may include other common additives such as fillers, antioxidants, UV and thermal stabilizers, adhesion promoters and the like, provided that they do not substantially interfere with the performance of the formulation for its desired purpose. In particular, optional fillers should not increase viscosity of a mastic beyond that practical for pumpability and all other additives must be sufficiently non-volatile to withstand devolatilization of the formulated composition. A suitable extending filler is a calcium carbonate filler, such as Hubercarb™ Q-325 sold by J. M. Huber, which may be employed at levels up to about 10% by weight of the composition, preferably about 5% or less.

Processing

The formulation is suitably made by heating and mixing all ingredients at an elevated temperature, typically 121–140° C.(250–284° F.), until a smooth and uniform mixture has been obtained. Higher temperatures may be required when butyl rubber is incorporated into the composition. Devolatilization of the heated formulation may be accomplished before or after addition of the desiccant/adsorbent. When the desiccant/adsorbent includes a chemical adsorbent as well as a desiccant, it is desirable that the mixture be devolatilized first, before addition of the adsorbent components. Suitably, the mixture is heated to about 150° C.(302° F.), evacuated to a vacuum pressure of less than 571.8 mm Hg (22 inches Hg) for at least 30 minutes, after which the adsorbent is added and the formulation then subjected to a second stage devolatilization of at least the same extent. The formulated mastic may ben be filtered directly into dry containers which are sealed until use.

The invention is illustrated by reference to the following non-limiting examples.

EXAMPLES

Devolatilized formulations were prepared from the ingredients shown in Tables 1–3 below, where quantities are in parts by weight. Melt flow times as specified above are also provided in Tables 1–3. All invention examples pass non-sag, non-fogging and UV stability criteria as described above.

TABLE 1

| Ingredients | Ex. 1 | Ex. 2 | Ex. 3 | Ex. 4 | Ex. 5 |
|---|---|---|---|---|---|
| Indopol ® H-100 | 4.45 | -.- | -.- | -.- | -.- |
| Indopol ® H-1500 | -.- | 4.45 | -.- | -.- | -.- |
| Indopol ® H-300 | -.- | -.- | 4.45 | 4.45 | 21.10 |
| Calcium carbonate | 5.49 | 5.99 | 5.99 | 6.90 | |
| Eastman D 178 | 42.74 | 42.74 | 42.74 | 37.74 | 21.09 |
| Irganox 1076* | 0.50 | -.- | -.- | -.- | -.- |
| Carbon Black** | 0.02 | 0.02 | 0.02 | 0.01 | -.- |
| $TiO_2$** | 1.80 | 1.80 | -.- | 0.90 | -.- |
| Hubercarb Q 325 | | | 1.80 | | 6.90 |
| Monarch 120 | | | | | 0.01 |
| Kronos 2020 | | | | | 0.90 |
| 3A Mol. sieve | 36.00 | 36.00 | 36.00 | 41.00 | 41.00 |
| 13X Mol. sieve | 9.00 | 9.00 | 9.00 | 9.00 | 9.00 |
| 4A Mol. sieve | -.- | -.- | -.- | -.- | -.- |
| Test Results | | | | | |
| Melt flow time (sec) | | | | | |
| 1100 gm load | 3 | 2.4 | 2.50 | <1 | |
| 725 gm load | | | **** | 5.3 | |
| 225 gm load*** | | | | | 10.2 |

*Optional antioxidant sold by Ciba Geigy
**Optional component
***At 190° C./1 minute wait
****At 190° C./1.5 minute wait

TABLE 2

Copolymer Rubbers in Matrix Products

| Ingredients | Ex. 6 | Ex. 7 | Ex. 8 | Ex. 9 | Ex. 10 |
|---|---|---|---|---|---|
| Eastman D 178 | 42.74 | 42.74 | 42.74 | 42.74 | 42.74 |
| Kraton G 1657 | 4.45 | -.- | -.- | -.- | -.- |
| Vector 4411 | -.- | 4.45 | -.- | -.- | -.- |
| Vector 4111 | -.- | -.- | 4.45 | -.- | -.- |
| SM8400 | -.- | -.- | -.- | -.- | 4.45 |
| XUR 59901 | -.- | -.- | -.- | 4.45 | -.- |
| Hubercarb Q 325 | 5.49 | 5.49 | 5.49 | 5.49 | 5.49 |
| UOP 3A Sieve | 36.0 | 36.0 | 36.0 | 36.0 | 36.0 |
| UOP 13X Sieve | 9.0 | 9.0 | 9.0 | 9.0 | 9.0 |
| Melt flow time (sec) 1100 gm/190° C. | 10.4 | 8.3 | 8.1 | 7.1 | 10.6 |

TABLE 3

Matrix Products

| Ingredients | Ex. 11 | Ex. 12 | Ex. 13 | Ex. 14 | Ex. 15 |
|---|---|---|---|---|---|
| Vistanex LMMS | 4.5 | 4.5 | -.- | 4.5 | 4.5 |
| Indopol H300 | | 20.0 | 12.5 | | |
| Parapol 1300 | | | | | 18.5 |
| Eastman D 178 | 33.5 | 13.5 | 22.5 | 33.5 | |
| SM8400 | 12.0 | 12.0 | 5.0 | | |
| Butyl 065 | | | 5.0 | | |
| Vector 4111 | | | 5.0 | | |
| Exxpol 0527 | | | | 12.0 | 27.0 |
| UOP 3A | 41.0 | 41.0 | 41.0 | 41.0 | 41.0 |
| UOP13X | 9.0 | 9.0 | 9.0 | 9.0 | 9.0 |
| Results | | | | | |
| Melt flow time (sec) 1100 gm/190° C. | 24.6 | 13.8 | 19.5 | 13.8 | 30 |

While discussed in terms of a desiccant for insulating glass units, the inventive compositions will also have use in other enclosed devices where a non-sagging self-supporting desiccant is desirable, especially applications where the desiccant is visible from outside the enclosure and/or in applications where the desiccant is applied via an automated production line. For example, the compositions may be applied as a film, bead, screen printing or strip on the interior of packaging for moisture sensitive items such as pharmaceuticals, computer components or other electronic devices, and the like, to eliminate the necessity of loading packaged desiccant in the package filling operation. In such applications the composition of the invention may be applied to the bottom of a vial, the inside of a cap, the inside of a foil or plastic bag, or the like.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

I claim:

1. A mastic composition, the composition being thermoplastic and being pumpable, whereby when tested as set forth in ASTM D-1238, Procedure B using a 1100 gram load and an 8 gram sample at 190° C., a melt flow time of no more than 60 seconds for a piston travel of 1 inch is obtained, the composition comprising:
   A) a resin component consisting essentially of:
      i) 4–75% by weight of the resin component of a film former, the film former including a member selected from the group consisting of:
         a) a homogeneous, substantially linear ethylene/α-olefin interpolymer;
         b) a linear, Y block or star block copolymer rubber; or
         c) mixtures of a, and/or b;
      alone, or combination with one or more polymers selected from the group consisting of:
         d) a liquid polybutene polymer;
         e) a polyisobutylene polymer having a weight average molecular weight of about 35,000 or more; and
         f) a butyl rubber having a weight average molecular weight of up to about 500,000, said butyl rubber, if present, representing less than 50% of the film former component;
      ii) 25–96% by weight of the resin component of an alkylene polymer component consisting of a member selected from the group consisting of:
         a) a non-crystalline homopolymer, copolymer, terpolymer or graft copolymer comprising a monomeric unit of propylene;
         b) a homogeneous substantially linear ethylene/α-olefin interpolymer; and
         c) mixtures thereof;
      iii) 0–20% by weight of the resin component of a low volatile UV stable tackifier compatible with the film former and alkylene components; and
   B) a desiccant/adsorbent component comprising:
      i) at least 20% by weight of the composition of a desiccant or moisture and volatile organic chemical adsorbing material; and
      ii) 0–10% by weight of the composition of an adsorbent of volatile organic compounds,
said desiccant/adsorbent component being present in an amount less than the level which will cause the composition when tested as set forth in ASTM D-1238, Procedure B using a 1100 gram load and an 8 gram sample at 190° C. to provide a melt flow time for a piston travel of 1 inch of more than 60 seconds.

2. A mastic composition as in claim 1 wherein the film-former component of the resin component comprises a said liquid polybutene polymer.

3. A composition as in claim 2 wherein the liquid polybutene has a number average molecular weight of from about 900 to about 3000.

4. A composition as in claim 1 wherein said composition is free of a tackifier.

5. A composition as in claim 1 wherein the film former includes a said polyisobutylene polymer or a said butyl rubber.

6. A composition as in claim 5 wherein the polyisobutylene polymer has a weight average molecular weight of from about 35,000 to about 60,000.

7. A composition as in claim 1 wherein the alkylene polymer component comprises at least one polymer selected from the group consisting of amorphous propylene homopolymers, ethylene-propylene copolymers, and butene-propylene copolymers and terpolymers.

8. A composition as in claim 1 wherein the alkylene polymer component is a propylene-containing polymer having a number average molecular weight of about 4000–7000 and a weight average molecular weight of about 16,000 to about 90,000.

9. A composition as in claim 1 wherein the film-former component comprises a Y block, linear or star block copolymer rubber.

10. A composition as in claim 9 wherein the aromatic/aliphatic linear or star block copolymer rubber is a member selected from the group consisting of styrene-isoprene-styrene, styrene-butadiene-styrene, styrene-ethylene-butene-styrene, styrene-ethylene-propylene-styrene, styrene-isoprene, styrene-ethylene-propylene, ethylene-butene-styrene and butene-styrene block copolymers and mixtures thereof.

11. A composition as in claim 1 wherein the film-former component comprises a homogeneous substantially linear ethylene/α-olefin interpolymer.

12. A composition as in claim 10 wherein said homogeneous substantially linear ethylene/α-olefin interpolymer is a interpolymer of ethylene with at least one comonomer selected from the group consisting of propylene, isobutylene, 1-butene, 1-hexene, 4-methyl-pentene, 1-heptene, 1-octene, cyclopentene, cyclohexene and cyclooctene.

13. A composition as in claim 12 wherein said interpolymer is a terpolymer of ethylene, a said comonomer, and a non-conjugated diene having from 6 to 15 carbon atoms.

14. A composition as in claim 1 wherein the desiccant/adsorbent component is a mixture of desiccant and volatile organic chemical adsorbing materials.

15. A composition as in claim 14 wherein the desiccant/adsorbent comprises 20–65% by weight of the composition of a member of the group consisting of molecular sieves 3A and 4A and mixtures thereof, and 5–10% by weight of the composition of molecular sieve 13x.

16. A composition as in claim 1 wherein said desiccant/adsorbent component comprises a zeolite A having a $K_2O$ content of greater than 14% by weight.

17. A composition as in claim 1 wherein the desiccant/adsorbent is in the form of a powder of 100 mesh or less.

18. A composition as in claim 1 wherein said desiccant/adsorbent component comprises a desiccant in an amount of at least 30% by weight of the composition.

19. A composition as in claim 1 wherein said desiccant/adsorbent component comprises a desiccant in an amount of about 40% to about 60% by weight of the composition.

20. A composition as in claim 1 further comprising a filler in an amount of about 10% or less by weight of the composition.

21. A composition as in claim 20 wherein the filler is calcium carbonate and is present at a level of 5% or less by weight of the composition.

22. A composition as in claim 1 wherein the formulation when installed in an insulating glass unit and maintained at a temperature of at least 60° C. for 2 weeks shows no visible sag or flow.

23. A composition as in claim 1 wherein said melt flow time at 190° C. is no more than 25 seconds.

24. A composition as in claim 23 wherein said melt flow time at 190° C. is no more than 15 seconds.

25. In an insulating glass unit comprising a pair of glass panels and an edge assembly separating and sealingly engaging the panels, the edge assembly and panels defining a sealed interior compartment, the improvement wherein a portion of the edge assembly on the inside of the compartment is coated with a mastic composition as in claim 1.

26. A method of applying a desiccating material to an edge assembly for an insulating glass unit, the edge assembly comprising a U-channel spacer opening into the interior of the insulating glass unit, the method comprising heating a mastic composition as in claim 1 to a temperature of about 88–121° C. pumping the formulation through an applicator onto the U-channel spacer and allowing the composition to cool to ambient temperature.

27. A method as in claim 26 wherein the application temperature is about 110° C.

28. An object defining a closed interior space, the object having an interior surface facing the closed interior space and the interior surface having on at least a portion thereof a layer of a mastic composition as in claim 1.

29. A composition as in claim 1 wherein said desiccant/adsorbent comprises calcium oxide.

* * * * *